United States Patent
Anderson (10) Patent No.: US 12,181,017 B2
(45) Date of Patent: Dec. 31, 2024

(54) VALVE ASSEMBLY

(71) Applicant: Fox Factory, Inc., Braselton, GA (US)

(72) Inventor: Bryan Wesley Anderson, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/361,038

(22) Filed: Jun. 28, 2021

(65) Prior Publication Data

US 2021/0324933 A1  Oct. 21, 2021

Related U.S. Application Data (63) Continuation of application No. 14/617,436, filed on Feb. 9, 2015, now Pat. No. 11,047,447.

(60) Provisional application No. 61/937,937, filed on Feb. 10, 2014.

(51) Int. Cl.
```
F16F 9/34      (2006.01)
F16F 9/348     (2006.01)
F16K 47/02     (2006.01)
```

(52) U.S. Cl.
CPC ............ *F16F 9/341* (2013.01); *F16F 9/3484* (2013.01); *F16F 9/3485* (2013.01); *F16K 47/023* (2013.01)

(58) Field of Classification Search
CPC .... F16F 9/34; F16F 9/341; F16F 9/348; F16F 9/3485; F16F 9/3487; F16F 9/3484; F16F 9/3482; F16F 9/3488; F16F 9/3214; F16K 47/023

See application file for complete search history.

(56) References Cited

U.S. PATENT DOCUMENTS

| | | | |
|---|---|---|---|
| 2,888,107 A | 5/1959 | De | |
| 4,060,155 A | 11/1977 | Duckett | |
| 4,352,417 A | 10/1982 | Stinson | |
| 4,615,420 A * | 10/1986 | Mourray | F16F 9/348 137/493.9 |
| 4,624,347 A * | 11/1986 | Mourray | F16F 9/348 137/493.9 |
| 4,809,829 A * | 3/1989 | Hummel | F16F 9/348 188/282.5 |
| 4,993,524 A | 2/1991 | Grundei et al. | |
| 5,316,113 A | 5/1994 | Yamaoka | |
| 5,325,942 A | 7/1994 | Groves et al. | |
| 6,978,872 B2 | 12/2005 | Turner | |
| 7,954,609 B2 | 6/2011 | Chikamatsu et al. | |

(Continued)

FOREIGN PATENT DOCUMENTS

| | | |
|---|---|---|
| EP | 1312827 A2 | 5/2003 |
| GB | 2075152 A | 11/1981 |

*Primary Examiner* — Thomas J Williams (57) ABSTRACT

A hydraulic valve includes a closure member, wherein the closure member is actuable toward an opening sealed thereby in the valve, but is unconstrained to move with respect to the opening when the valve is in a dosed position. In an aspect, the closure may be a thin disk, in the shape of a flat washer, which is located between the valve and piston of a hydraulic damper, and when the valve is positioned away from an opening through the piston by virtue of differential pressure across the valve in a dampening r rebound stroke, the disk is free to rotate, move from side to side, and move away from and toward the piston. By employing such a disk, sympathetic vibrations in the damper created during compression events are eliminated.

8 Claims, 8 Drawing Sheets

(56) References Cited

U.S. PATENT DOCUMENTS

| | | | |
|---|---|---|---|
| 8,083,039 B2 | 12/2011 | Vanbrabant | |
| 8,544,621 B2 | 10/2013 | Yamamoto et al. | |
| 9,228,631 B2 | 1/2016 | Kiyonaga | |
| 11,047,447 B2 * | 6/2021 | Anderson | F16F 9/3484 |
| 2002/0096408 A1 | 7/2002 | Moradmand et al. | |
| 2005/0183911 A1 | 8/2005 | Wilda et al. | |
| 2009/0057080 A1 | 3/2009 | Deferme | |
| 2011/0266105 A1 | 11/2011 | Yamamoto et al. | |
| 2011/0290604 A1 | 12/2011 | Six et al. | |
| 2012/0048666 A1 * | 3/2012 | Murakami | F16F 9/348 |
| | | | 188/315 |
| 2013/0020159 A1 | 1/2013 | Groves et al. | |
| 2015/0159724 A1 | 6/2015 | Kiyonaga | |
| 2016/0025181 A1 | 1/2016 | Nowaczyk et al. | |

\* cited by examiner

VALVE ASSEMBLY

CROSS-REFERENCE TO RELATED APPLICATIONS

This application is a Continuation of and claims the benefit of co-pending U.S. patent application Ser. No. 14/617,436, filed on Feb. 9, 2015, entitled "VALVE ASSEMBLY" by Bryan Wesley Anderson, assigned to the assignee of the present application, and is hereby incorporated by reference in its entirety herein.

The application Ser. No. 14/617,436 claims the benefit of and claims priority of U.S. provisional patent application Ser. No. 61/937,937, filed on Feb. 10, 2014, entitled "VALVE ASSEMBLY" by Bryan Wesley Anderson, assigned to the assignee of the present application, and is hereby incorporated by reference in its entirety herein.

BACKGROUND

Field of the Invention

The present invention relates to the field of hydraulic valves, wherein a hydraulic valve element is configured to enable or prevent fluid flow therepast or therethrough. More particularly, the invention relates to hydraulic valve(s), with a valve seat member having a valve seat therein adjacent to an opening, the flow through which is controlled by the hydraulic valve, and a valve element member that includes structure therein that is configured to sit against the valve seat and thereby open and close off fluid flow through the opening. The valve seat member and the valve element member are provided in a movable relationship to one another.

BACKGROUND

Hydraulic valves commonly include a valve seat which may surround an opening, the flow through which is cant oiled by the valve, and a separate dosing structure, which may be located on a second element which is moveable with respect to the valve seat to open and close off fluid access to the opening. The second element of the valve is commonly biased with respect to the first element, either to maintain separation thereof from the first element during normal operation, or to maintain the valve seat and element in contact with one another by biasing the closing structure to press against the valve seat and thereby close off the opening to fluid flow therethrough. The bias may be maintained by mechanical mechanisms such as springs, electrical mechanisms such as actuators, or simply by fluid pressure, when changes in fluid pressure on one or the other side of the valve opening can create a net force to overcome a normal operational biasing force and cause relative movement between the two valve elements.

Hydraulic valves are used in many applications, including hydraulic damping systems for vehicles, such as for two wheeled vehicles such as bicycles and motorcycles and three wheeled and larger vehicles, such as automobiles and trucks. In these damping systems, restricted flow through the valve opening may be used to create a damping force in the vehicle suspension, thereby reducing the velocity at which the vehicle body and a tire or other terrain encountering element move with respect to one another when the vehicle moves over an obstacle or encounters a recess such as a depression in pavement.

During high force events, where the vehicle suspension components would otherwise move rapidly with respect to one another, the flow velocity and the rate of fluid flow through the openings can reach a maximum attainable value. Likewise, during lower energy events, when open, the openings may provide minimal restriction to fluid flowing therethrough. Thus, the valve needs to be designed to meet a broad range of flow quantities and flow velocities to properly dampen the relative motion of the vehicle frame and suspension.

One issue encountered in hydraulic valves is that at certain fluid flow speeds or flow quantities therethrough, the flow through the opening, or through a flow path adjacent to or within the valve leading to or from the opening, may create a chirp or squeal sound, or deeper clunk sound accompanied by a physical sensation. While not wishing to be bound by theory, these effects are believed to be caused by a driven oscillation of the valve elements resulting in undesirable seating characteristics, such as the closing element of the valve oscillating adjacent to or on the seat, or not closing smoothly as a result of the oscillation such that an excess pressure is required to overcome the oscillation and a hard impact of the closing element against the valve seat occurs. The chirp, squeal or clunk sound, and any physical manifestation thereof, can cause users of the vehicle to believe the damper has failed, causing return of the vehicle for service. Further, the initiation of these valve sounds and oscillations vary depending on the properties of the hydraulic fluid passing through the valve, such as viscosity, which changes as a result of changes in temperature of the fluid and/or the quantity of air or gas entrained in the fluid.

SUMMARY

A valve assembly is provided, that includes: a first member having at least one opening therethrough and is controlled by the valve assembly, wherein a valve seat is located at or adjacent to an end of the opening; a second member actuable toward and away from the valve seat; and a thin member located intermediate of the valve and the end of the opening, which is free, within constrained limits, to move with respect to both the first and second members. When the second elements move in the direction of the first element, the thin member is positioned against the end of the opening to seal the opening from fluid flow therethrough.

The first and the second members and the thin member may be annular structures, such that a bolt or other connector may pass through an aperture in the centers thereof, and thus secure the elements together. The thin member has a thickness which is less than one-half the distance that the second member may retract away from the first member. The thickness is more preferably a thickness in the range of 15 to 40 percent of the retraction distance; the retraction distance being the maximum distance between the first and the second member, not including the thin member.

The position of the first and second members relative to one another may be enabled solely by hydraulic fluid pressure on opposed sides of the valve, or additional mechanical bias, such as a mechanical spring in the form of a coil spring or Belleville washer, or an electromechanical bias, such as provided by an actuator, or a magneto mechanical mechanism, may be employed, in addition to the difference in hydraulic fluid pressure to either side of the valve assembly, to effect both the difference in pressure at which the valve opens, as well as the extent (size) of the opening.

Where the first and the second members and the thin member are annular structures, the hydraulic fluid flowing from the higher pressure to the lower pressure side of the valve will leave the valve element in an at least partially radial direction. This may be radially outwardly, or radially inwardly, depending on the valve layout.

The valve structure may be employed as the piston assembly in a hydraulic damper, such as that used to dampen impact and rebound from impact events in a vehicle.

The drawings referred to in this description should be understood as not being drawn to scale except if specifically noted.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

The following discussion will first briefly describe various embodiments. The discussion then turns to a description of the FIGS. 1-11 and embodiments shown therein.

Embodiments describe a hydraulic valve in which a first element thereof includes a passage extending therethrough and opening into a face thereof, and a second element that is configured to move against or away from the opening to close or open the valve to fluid flow. When in the open position, the fluid flows from the opening and through a gap between the first and second elements to the lower pressure side of the valve. Thus, the spacing between the second element and the opening will affect the resistance to flow of the fluid and thus the flow rate through the valve. It has been found that in such a valve structure, the valve can emit sounds such as a chirping, squealing or clunking sound, and in some cases, cause the second element to oscillate at or near the opening when the valve should be in an open position or closed position. When the valve is used as the piston assembly in a suspension to vehicle damping system, this can lead to jerking or vibration of the vehicle frame as the valve rapidly opens and closes during a compression event. Embodiments herein locate a thin spacer element of a size capable of blocking the opening when pressed there against by the second member, but also not physically rigidly connected to any other valve structure, the noises are ameliorated to the point of not being noticeable, or are completely eliminated.

Figure 1:
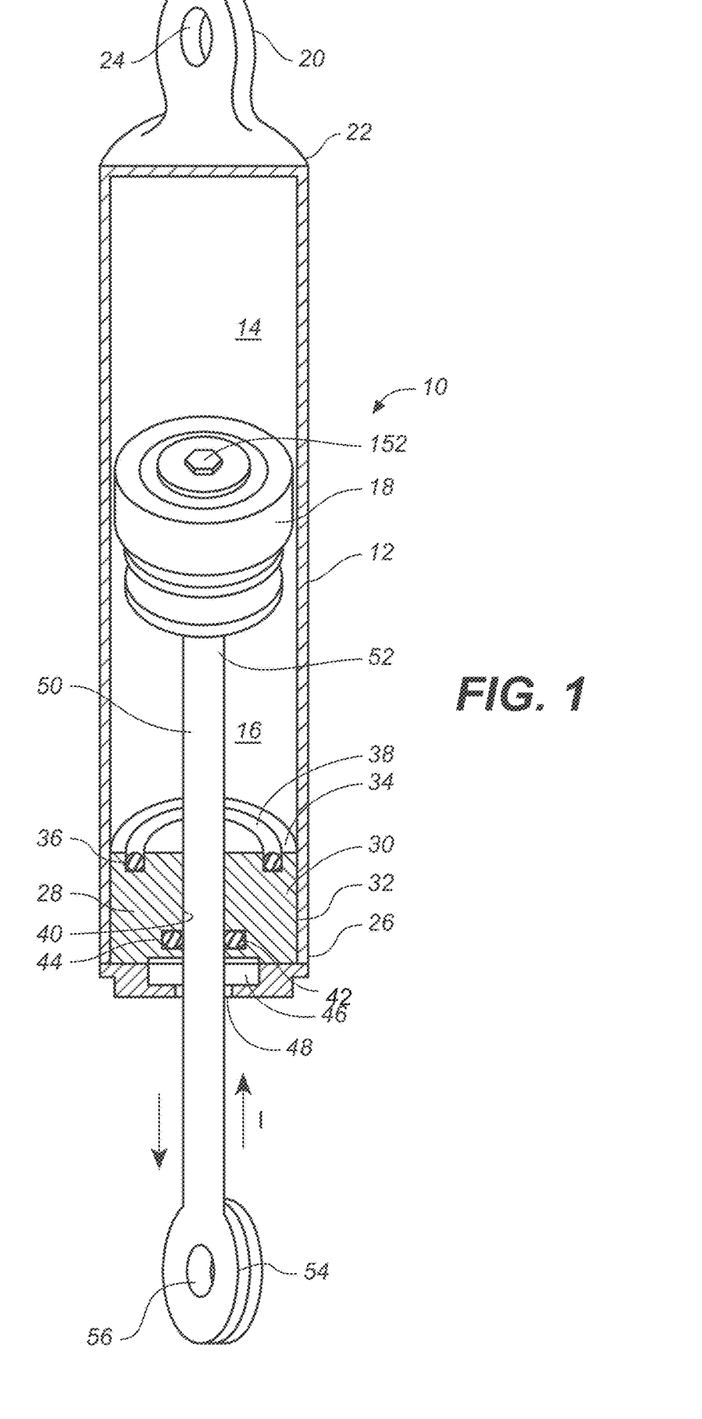
FIG. 1 depicts a partial sectional schematic view of a hydraulic damper, according to an embodiment.
Figure 2:
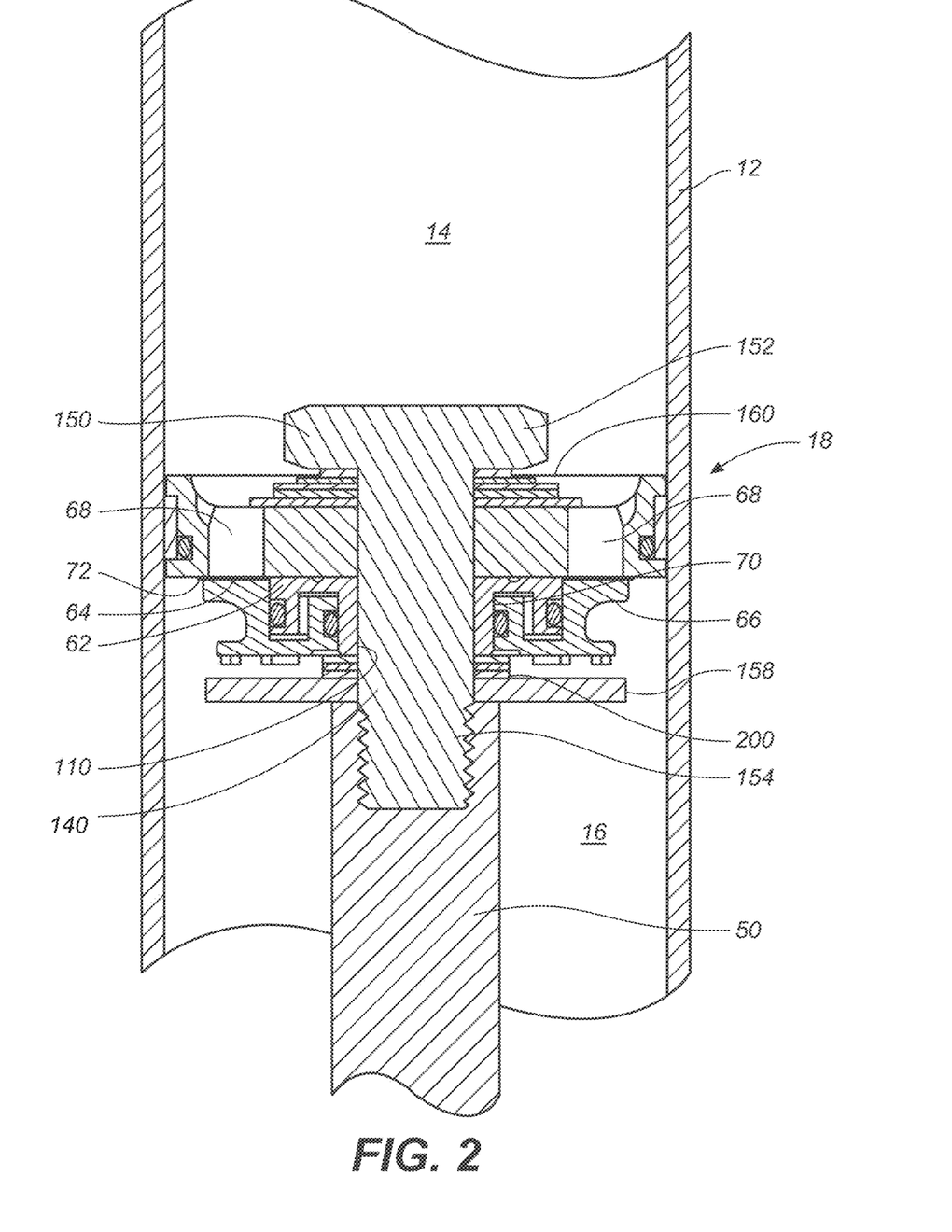
FIG. 2 depicts a sectional view of a piston of a hydraulic damper of FIG. 1 at section 2-2 of FIG. 4, in accordance with an embodiment.

Referring first to FIGS. 1 and 2, there is shown, in accordance with an embodiment, a depiction of a damper 10, having a damper housing 12 which is internally separated into a compression volume 14 and a rebound volume 16 by a piston assembly 18 movably disposed therein, the motion of which changes the relative sizes of the compression volume 14 and the rebound volume 16. The damper housing 12 is filled with hydraulic fluid through a fill port, not shown. The damper housing 12 also includes a first mount 20 on the exterior of a first end 22 thereof, which includes a bushed aperture 24 through which the damper 10 may be connected to the body or to the suspension of the vehicle. The second end of the cylinder 26 includes a sealing plug 28 extending therein and secured thereto by mating threads 30, 32 on the exterior of the sealing plug 28 and the interior of the damper housing 12 at the second end of the cylinder 26 thereof. The inwardly facing end of the sealing plug 28 includes a landing face 34 thereon, which limits the outward travel of the piston assembly 18 from the damper housing 12, having a circumferential recess 36 extending therein into which a compliant member, such as an o-ring 38, may be received. The sealing plug 28 also includes a sealed bore 40 extending therethrough, through which a push rod 50 extends. A seal groove 42 is provided inwardly of the sealed bore 40, having a seal 44 therein which seals against the outer circumference of the rod 50. A second bore 46, and a clearance opening 48, surround the push rod 50 as it exits and enters the sealing plug 28. A wiper or other generally elastic component, not shown, may be located in the second bore 46 to prevent contamination from reaching the seal 44/push rod 50 interface.

The push rod 50 is secured, at a first end 52 thereof, to the side of the piston assembly 18 facing the rebound volume, and extends therefrom through the sealed bore 40 of the sealing plug 28, where it terminates in second mount 54, which includes the bushed hole 56 therethrough. The second mount 54 secures the damper 10 to the other of the body and suspension portions of a vehicle.

In use, the damper 10 acts to dampen forces acting on the exterior of the push rod 50, or on the first mount 20 on the damper housing 12, tending to depress the push rod 50 into the damper housing 12 during a compression event (arrow I), as well as forces of retraction tending to extend the push rod 50 outwardly of the damper housing 12 during a rebound event (arrow O). This occurs, at least in part, by the action of the piston assembly 18 moving through the hydraulic fluid in the damper housing 12. Because hydraulic fluid is incompressible or substantially incompressible over the range of forces that are imposed thereon in the damper, hydraulic fluid on one side of the piston assembly 18 must move out of the volume it occupies if the piston assembly 18 is to move in the direction of that volume, and move into the volume where the piston assembly 18 is moving away from and thus enlarging that volume must be supplemented with additional hydraulic fluid, or the piston assembly 18 cannot move. In the embodiment shown herein, this is accomplished by selectively flowing or restricting (sealing off) openings which extend through the piston assembly 18 between the compression volume 14 and the rebound volume 16.

Figure 3:
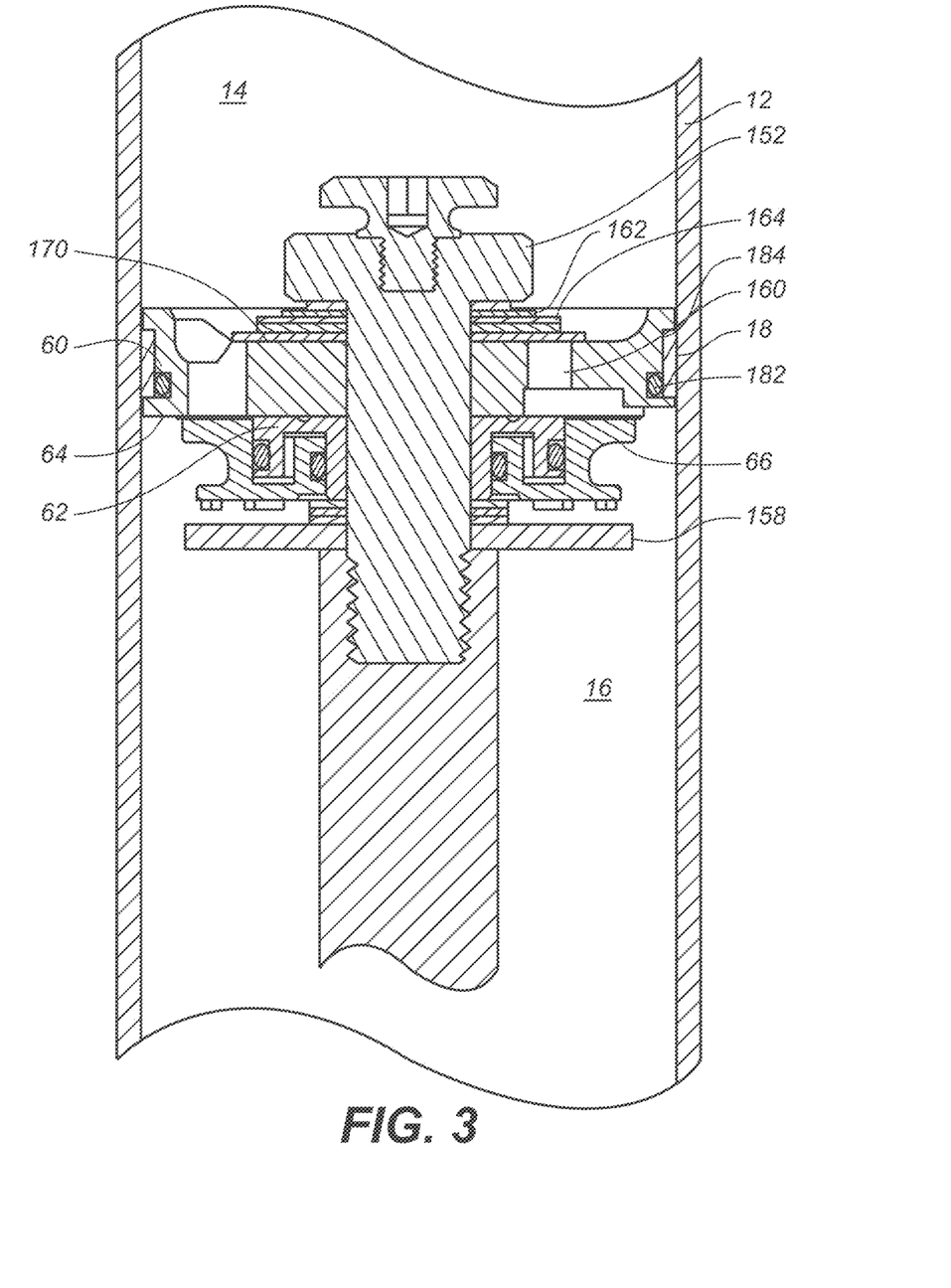
FIG. 3 depicts an additional sectional view of a piston of a hydraulic damper of FIG. 1 at section 3-3 of FIG. 4, in accordance with an embodiment.
Figure 4:
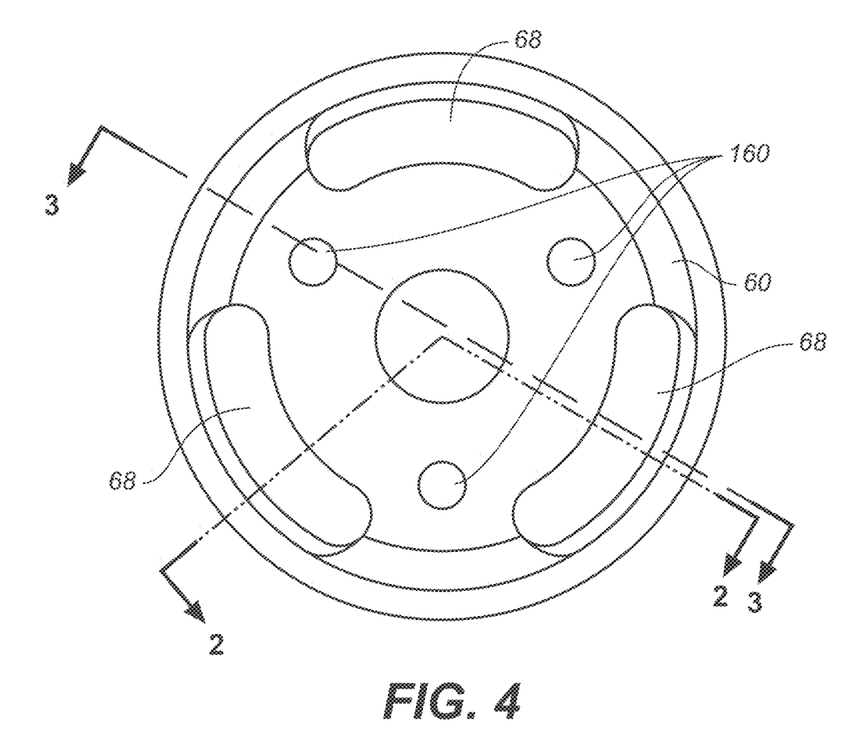
FIG. 4 depicts a plan view of the top of the piston of the damper of FIG. 1, with the connecting bolt and upper shims removed for clarity, in accordance with an embodiment.
Figure 7:
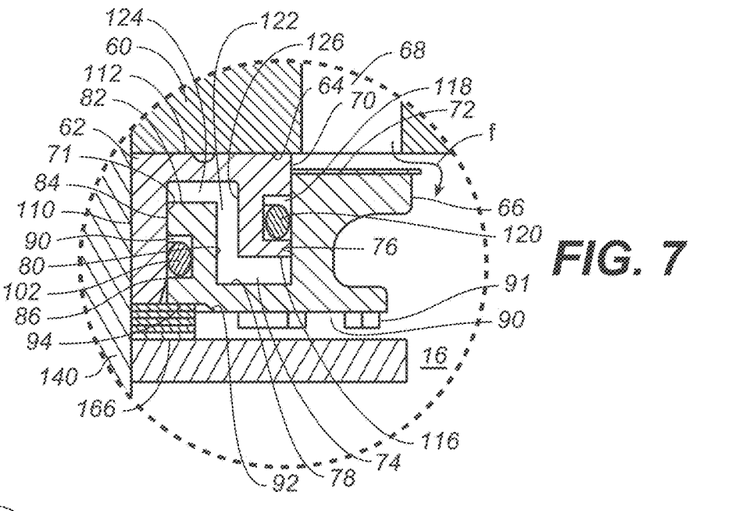
FIG. 7 depicts an enlarged partial view of the piston of FIGS. 2 and 3 in the open position, in accordance with an embodiment.

Referring now to FIGS. 2 and 4, details of piston assembly 18 are shown, in accordance with an embodiement. The piston assembly 18 has a similar structure, but for the improvement in noise elimination disclosed herein, as that shown and described in U.S. Pat. No. 6,978,872, which is incorporated herein by reference. FIGS. 2 and 3 are cutaway views along lines 2-2 and 3-3 of the piston assembly 18 of FIG. 4, wherein portions of the piston assembly 18 securing the piston assembly 18 together were removed for clarity. In both FIGS. 2 and 3, the arcuate passages 68 are shown in the closed position. The open position of the arcuate passages 68 is shown in FIG. 7. The piston assembly 18 includes a piston 60, a guide element 62 in abutting engagement with the underside surface 64 of the piston 60, and a sliding valve 66 selectively moveable to be positioned against, or spaced from, the underside surface 64 of the piston 60, and guided in an axial direction by surfaces of the guide element 62.

Referring now to FIG. 2, the piston 60 includes a plurality of arcuate passages 68 extending therethrough, (3 as shown in FIG. 4), which provide an unobstructed flow path entry thereinto from the compression volume 14 side of the piston assembly 18, but are selectively closable and openable at the rebound volume 16 side thereof. The opening and closing of the passages 68 to the rebound volume 16 is controlled by the position of the sliding valve 66, and a thin annular disk 146 vis a vis the underside surface 64 of the piston 60 at the location of the arcuate passages 68.

Figure 5:
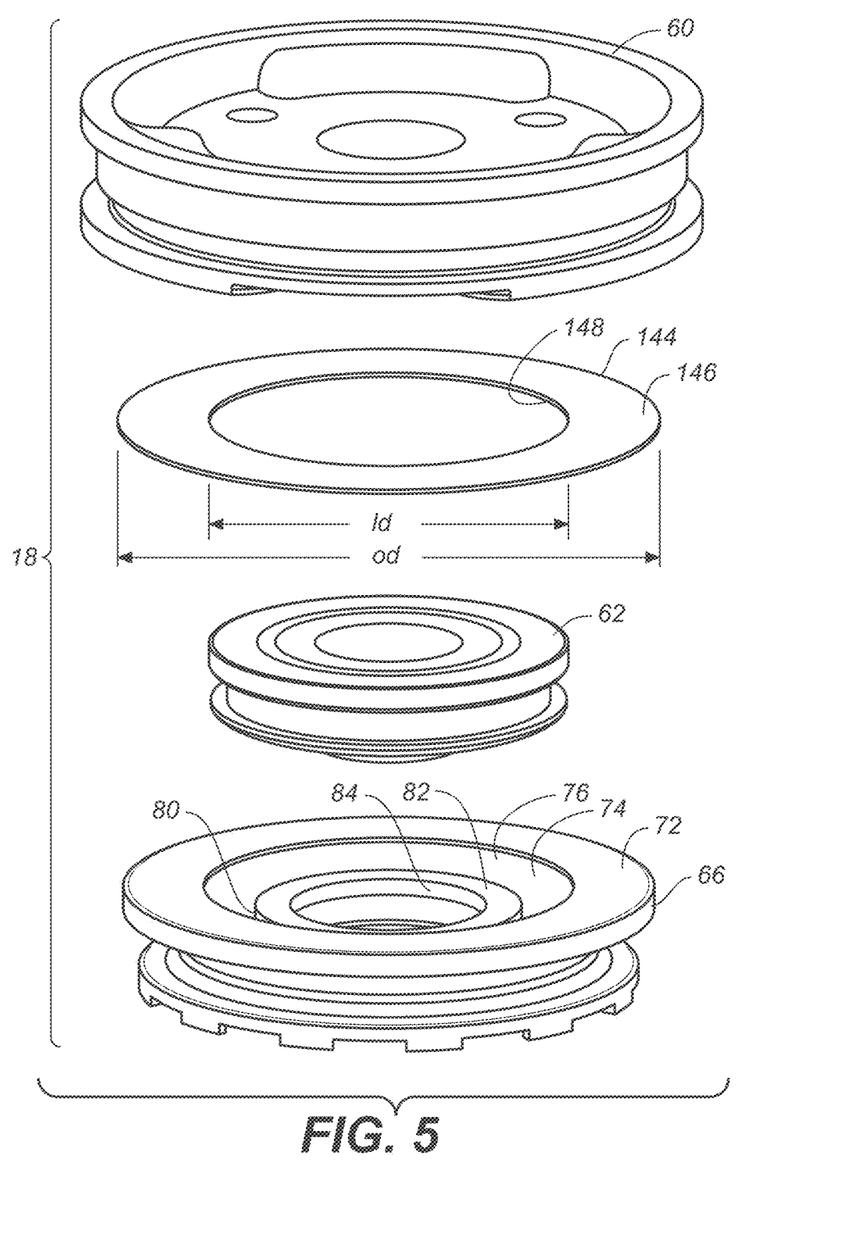
FIG. 5 depicts an exploded view of a part of the piston of FIGS. 2 and 3, in accordance with an embodiment.
Figure 6:
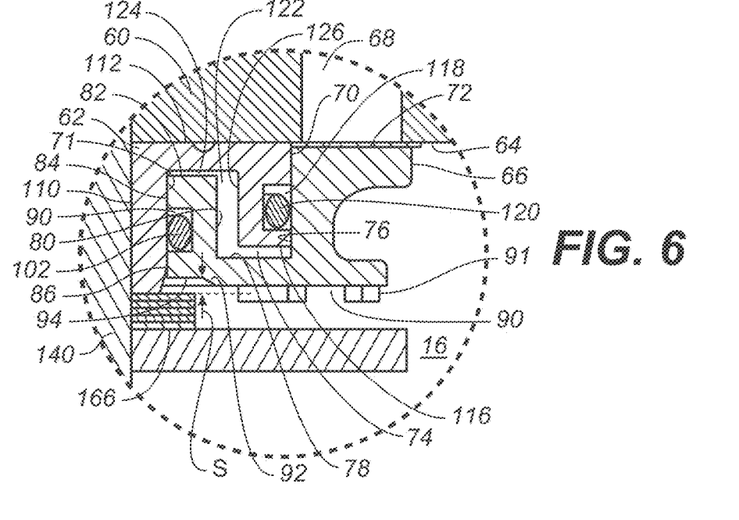
FIG. 6 depicts an enlarged partial view of the piston of FIGS. 2 and 3 in the closed position, in accordance with an embodiment.

Referring particularly now to FIGS. 6 and 7, sliding valve 66 is configured to move freely in the axial direction of the damper housing 12 on an outer circumferential surface 70 of the guide element 62, and be sealingly engaged with an inner circumferential surface 71 thereof, in accordance with an embodiment. Thus, the sliding valve 66 is a generally right circular element (as seen in the exploded view of the piston assembly 18 of FIG. 5). The inner portion of the body of the sliding valve 66 extends from a circumferential annular face 72 extending annularly around the perimeter of the sliding valve 66 on one side thereof, and includes a circumferential recess 74 extending inwardly of the body and bounded by an outer wall 76, a base 78, and an intermediate wall 80 extending from the wall generally parallel to, and spaced from, outer wall 76. Extending inwardly from the end of intermediate wall 80 distal from the base 787 is a ledge 82, which terminates at an inner circumferential surface 71 of the guide element 62. On the opposed side of the sliding valve 66, a lower wall surface 90 includes spaced projections 91 extending therefrom, and a countersink region having tapered circumferential wall 92 extending inwardly of the body of the sliding valve 66 from the lower wall surface 90, and a recessed face 94 extending circumferentially around an inner bore 110 of the sliding valve 66. A lower inner wall 98 extends upwardly from the recessed face 94, such that a gap in which the seal bore 98 is formed, extends between the lower terminus of the inner all 84 and the upper terminus of the lower inner wall 86, and an o ring 102 is received therein to seal the inner bore 100 of the sliding valve 66 against the inner circumferential surface 71 of the guide element 62.

Referring still to FIGS. 6 and 7, guide element 62 includes an inner bore 110, through which a bolt shank 140 extends (FIG. 2), and extending therefrom adjacent to and contacting the underside surface 64 of the piston 60, an outwardly projecting face 112 terminating in the downwardly projecting outer circumferential surface 70. The outer circumferential surface 70 of the guide element 62 includes a seal recess 118 to which an o-ring seal 120 is provided to seal the outer circumferential portion at the outer circumferential surface 70 of the guide element 62 to the outer wall 76 of the sliding valve 66. Additionally, at the lower end of the guide element 62, a recess 122 is formed and is bounded by inner circumferential surface 71, base 124 and wall 126, and from the lowermost end of wall 126 extends a lower annular face 116 terminating at the outer circumferential surface 70. Thus, the interfaces of adjacent surfaces of the guide and the valve are sealed at two different locations. A thin annular disk 146 is located between the sliding valve 66 and the opening of the arcuate passage 68 through the underside surface 64 of the piston 60. The design features of the guide element 62 and sliding valve 66 form mating circumferential recesses and protrusions, in which o-ring seals are provided, such that axial movement of the sliding valve 66 with respect to the guide element 62 is possible, but radial and rotational movement is significantly constrained.

Referring back to FIGS. 2 and 3, the piston assembly 18, including the piston 60, guide element 62, thin annular disk 146 and the sliding valve 66, are held together by the bolt 150, having a bolt head 152 extending radially outwardly around the circumference of the bolt head 152 in a hexagonal profile as shown in FIG. 1, the bolt shank 140 extending therefrom and through the piston 60, guide element 62, thin annular disk 146 and sliding valve 66, and extending therefrom and terminating in a threaded end 154. A limit plate 158 is received around the bolt shank 140 adjacent to the threaded end 154 in the end of the push rod 50, to secure the piston assembly 18 together.

Two additional elements are also located in the piston assembly 18, both of which extend circumferentially around, and are held in place therein, by the bolt shank 140 extending through the limit plate 158 and threaded into the push rod 50. These include a plurality of valve shims 164, disposed between the underside 162 of the bolt head 152 of the bolt shank 140 on the side of the piston 60 opposite to the position of the sliding valve 66, and which serve as bendable valve shims for selectively allowing fluid to pass through a plurality of second apertures 160 extending through the piston 60. On the valve side of the piston assembly 18, between the limit plate 158 and the lowermost extending portion of guide element 62 are one or more spacers 166.

Figure 8:
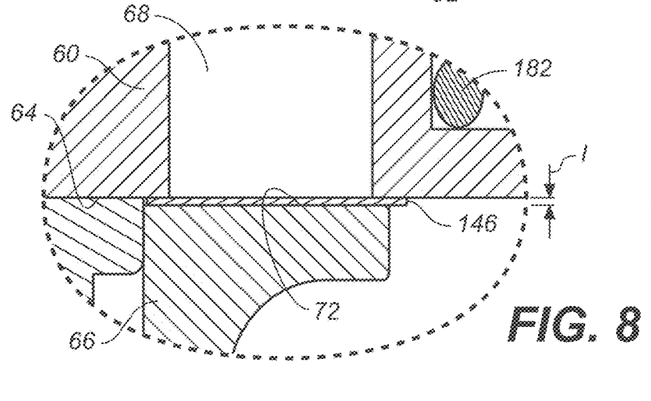
FIG. 8 depicts an enlarged view of the closure in position to seal a passage of the piston of FIGS. 2 and 3, in accordance with an embodiment.

Referring now to FIGS. 5, 6, and 7, details of the closure element for the valve assembly of the piston assembly 18 is shown, in accordance with an embodiment. In this embodiment, the thin annular disk 146, which, when provided, results in amelioration or elimination of chirping, squealing or the chunk sound during operation of the valve to open and close the arcuate passages 68, is shown. The thin annular disk 146, having an inner circumference 142 of a diameter "id", and an outer circumference 144 of a diameter "od" is shown (best seen in FIGS. 5, 6, and 7) disposed between the circumferential annular face 72 of the sliding valve 66 and the underside surface 64 of the piston 60 such that when the sliding valve 66 is in the closed position, as shown in FIGS. 2 and 6, the thin annular disk 146 covers the arcuate passages 68 and thereby closes off flow through the arcuate passages 68 between the compression volume 14 and the rebound volume 16. When the sliding valve 66 is in the open position with respect to the piston 60, as shown in FIGS. 3 and 7, the thin annular disk may retract away from the arcuate passages 68, allowing fluid flow therethrough. As is also shown in FIG. 8, the thin annular disk 146 has a thickness I. The outer diameter "od" of the thin annular disk 146 is greater than the outer diameter of the sliding valve 66, and the inner diameter of the thin annular disk 146 is slightly larger than the outer diameter of the guide element 62 at the outer circumferential surface 70 thereof.

Referring particularly now to FIGS. 6 and 7, when the sliding valve 66 is positioned to position the thin annular disk 146 to close off the arcuate openings 68, a gap "s" exists between the recessed face 94 and the furthest extension of the spacers 166 from the limit plate 158. When, as shown in FIG. 7, the sliding valve 66 is in the fully retracted position from the underside surface 64 of the piston 60, the recessed face 94 thereof contacts the furthest extension of spacers 166 from the limit plate 158, which occurs when the sliding valve 66 has moved away from the piston 60 by the distance s. In this position, fluid from the compression volume 14 moves through the arcuate passages 68 and flows radially outwardly from the gap between the annular thin plate 146 and the underside surface 64 of the piston 60 and then into the main volume of the rebound volume 16 as shown by arrow f of FIG. 7.

The thin annular plate 146 is not rigidly secured to any element of the piston assembly 18. Thus, in the valve closed position of FIGS. 2, 3, and 6, the thin annular plate 146 is constrained against movement only by the force of the sliding valve 66 against the piston 60, which is a function of the pressure in the arcuate passages 68 multiplied by the cross sectional area of those arcuate passages 68, relative to the pressure in the rebound volume 16 multiplied by the effective area of the sliding valve 66 which is exposed to the rebound volume (the relative area of which is larger than that of the arcuate passages 68), and by the guide element 62. When the pressure in the arcuate passages 68 multiplied by the cross sectional area of those arcuate passages 68, exceeds the pressure in the rebound volume multiplied by the effective area of the valve which is exposed to the rebound volume, the net force at the surface of the thin annular disk 146 exposed to the arcuate passages 68 will be in the direction of the rebound volume. Once any adhesive tension of the disk to the underside surface 64 of the piston 60 and the friction of the o-ring seals 120 and 102 between the guide element 62 of the sliding valve 66 are overcome, the sliding valve 66 will move away from the underside surface 64 of the piston 60, and hydraulic fluid will flow from the compression volume 14 to the rebound volume 16 sides of the piston assembly 18 through arcuate passages 68.

However, the thin annular disk 146 is now free to move radially to the limit of the difference between the "id" thereof and the circumference of the outer circumferential surface 70 of the guide element 62, as well as rotationally about its circumference, and axially toward and away from the circumferential annular face 72 and the opening of the arcuate passage 68 through the underside surface 64. By employing the thin annular disk 146, it has been found that in comparison to a piston assembly having the same relative sizes and shapes of the elements, but which does not employ the thin annular disk 146, the undesirable noise does not occur, wherein when a damper without the thin annular disk 146 is employed, the undesirable noise occurs. This has been verified in a piston assembly having the structure of FIGS. 2 to 7 hereof, where the flow leaves the arcuate passages 68 in a radial outward flow direction, and in a similar piston assembly structure, but the flow is radially inward across the face of the thin annular disk 146 from the high to the low pressure side of the piston assembly. Additionally, employing a thin annular plate 146 which has a thickness I which is 15% to 40% of the spacing "s", the noise emanating from the valve as fluid flows therethrough is eliminated or is non-detectable.

The piston assembly 18 of the embodiment is also configured to selectively open and close a flow path from the rebound to the compression sides of the piston assembly 18, when the rebound volume 16 pressure is greater than that in the compression volume 14. Referring now to FIGS. 3 and 4, operation of the piston assembly 18 to enable hydraulic fluid flow from the rebound volume 16 to the compression volume 14 will be described. As discussed infra, a plurality of second apertures 160 extend through the piston 60. The plurality of valve shims 164 are positioned over the compression side face 170 of the piston 60. The plurality of valve shims 164 are positioned over the compression side face 170 of the piston 60, and extend outwardly from the center thereof so as to overlap the location of the opening through the compression side face 170, but not so far as to block or overlay the arcuate passages 68. On the rebound volume side of the piston 60, a plurality of recesses equal in number to the number of the plurality of second apertures 160 extend inwardly of the underside surface 64 of the piston 60 where the plurality of second apertures 160 open therethrough. These recesses (only one shown) extend radially outwardly to the outer circumference of the piston 60, providing a gap between the thin annular disk 146 and the plurality of second apertures 160 even when the thin annular disk 146 is pressed against the underside surface 64 of the piston 60. Thus, the radial opening between the thin annular disk 146 and the arcuate opening 68 is present and maintained.

The piston 60 is configured to slide within the damper housing 12 while preventing fluid leakage between the piston 60 and the interior wall of the damper housing 12. The piston 60 is thus provided with an annular recess 184, within which a sliding seal ring 182 made of a plastic such as Delran is received, and a seal ring is received within a further recess to seal and push against the seal ring 182.

Operation of the damper 10 will now be described. In a compression stroke, where forces acting on the push rod 50 or the damper housing 12 tend to move the push rod 50 in the direction I with respect to the damper housing 12, movement of the piston in the direction of the first end 22 of the damper housing 12 will result in higher hydraulic fluid pressure in the compression volume 14 than in the rebound volume 16, causing the thin annular disk 146 and the sliding valve 66 to move away from the underside surface 64 of the piston 60 in an axial direction generally parallel to the longitudinal axis of the push rod 50, guided by the complementary surfaces of the guide element 62 and the sliding valve 66, thereby allowing the thin annular disk 146 to move off of the underside surface 64 of the piston 60 and causing the arcuate passages 68 to be in open communication with the compression volume 14 and the rebound volume 16. As a result, the piston 60 can move within the damper housing 12 in the direction of the first end 22 thereof, under the dampening effect of the hydraulic fluid being restricted by flowing through the arcuate passages 68. Also, the pressure in the compression chamber that is higher than the rebound chamber ensures a hydraulic fluid force acting in the direction "O" on the plurality of valve shims 164 to help maintain them in a closed condition.

Figure 9:
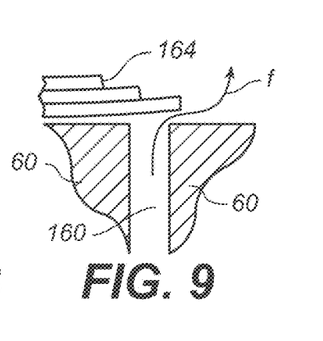
FIG. 9 depicts an enlarged view of an additional passage and shim valve in an open position of the piston of FIGS. 2 and 3, in accordance with an embodiment.

When the full compression stroke is completed, and the forces acting on the push rod 50 and/or the damper housing 12 tend to move the push rod 50 in the direction "O" relative to the damper housing 12, the piston assembly 18 moves away from the first end 22 of the damper housing 12 and thereby in a direction to reduce the size of the rebound volume 16. As a result, the pressure in the rebound volume 16 will exceed that in the compression chamber, causing the sliding valve 66 and thus the thin annular disk 146 to move against the underside surface 64 of the piston 60 and seal off access of hydraulic fluid in the rebound volume 16 to the arcuate passages 68. As the pressure in the rebound chamber rises, it will reach a level higher than that in the compression chamber whereby the hydraulic pressure in the plurality of second apertures 160 is sufficient to cause the plurality of valve shims 164 to bend as shown in FIG. 9, and thus allow hydraulic fluid to follow path f from the plurality of second apertures 160 into the compression chamber. Thus, as hydraulic fluid leaves the chamber having the rebound volume 16 and enters the chamber having the compression volume 14 through the restricted plurality of second apertures 160, a dampened rebound effect is achieved.

Figure 10:
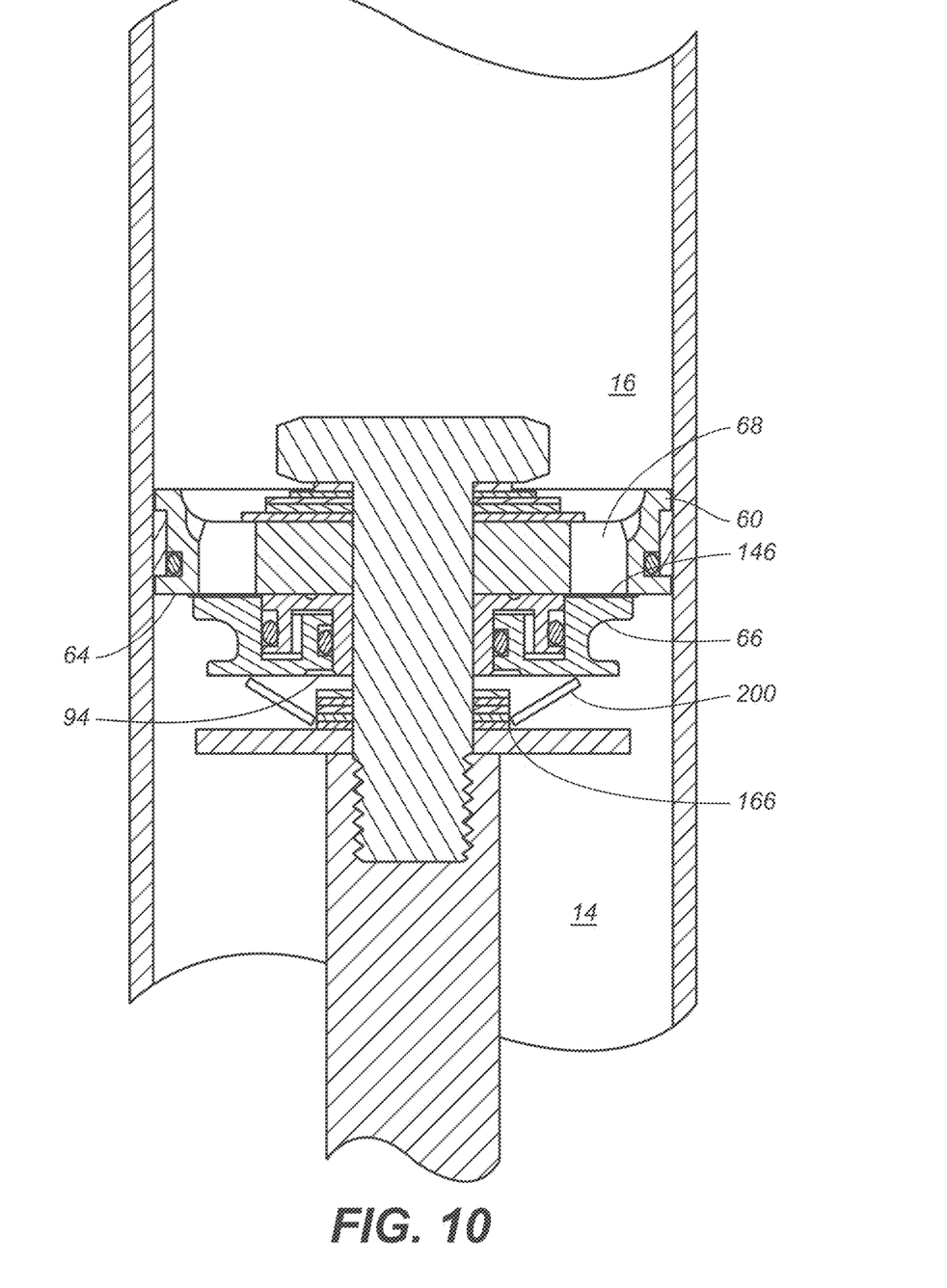
FIG. 10 depicts a sectional view of an alternative embodiment of the piston shown in FIGS. 2 and 3, wherein a Belleville washer is employed to add additional closing force of the passage through the piston, in accordance with an embodiment.

Although the embodiment of a valve assembly described herein in relation to a piston assembly of a damper includes a relatively free floating sliding valve 66 element, i.e., one biased on or off the opening by differential fluid pressure only, the sliding valve 66, and may be otherwise additionally or solely biased. For example, as shown in FIG. 10, the sliding valve 66 is additionally biased by a Belleville washer 200 disposed between the limit plate 158 and the underside of the sliding valve 66 facing the limit plate 158. To maintain the same distance between the uppermost surface of the one or more spacers 166 and the recessed face 94 of the sliding valve 66, additional spacers are added to extend the height or span thereof from the limit plate 158. The Belleville washer 200 is shown in FIG. 10 in an extended but still compressed position, wherein force is imparted by the Belleville washer 200 against the underside of the sliding valve 66, urging the sliding valve 66, and thus the thin annular disk 146, in a position to seal the opening of the arcuate passages 68 through the underside surface 64 of the piston 60. To move the thin annular disk 146 away from the openings of the arcuate passages 68 in the underside surface 64 of the piston 60, the pressure in the arcuate passages 68 multiplied by the cross sectional area of those arcuate passages 68, must exceed the pressure in the rebound volume 16 multiplied by the effective area of the valve which is exposed to the rebound volume 16 plus the force of the Belleville spring 200 acting to urge the sliding valve 66 in the direction of the piston 60.

Figure 11:
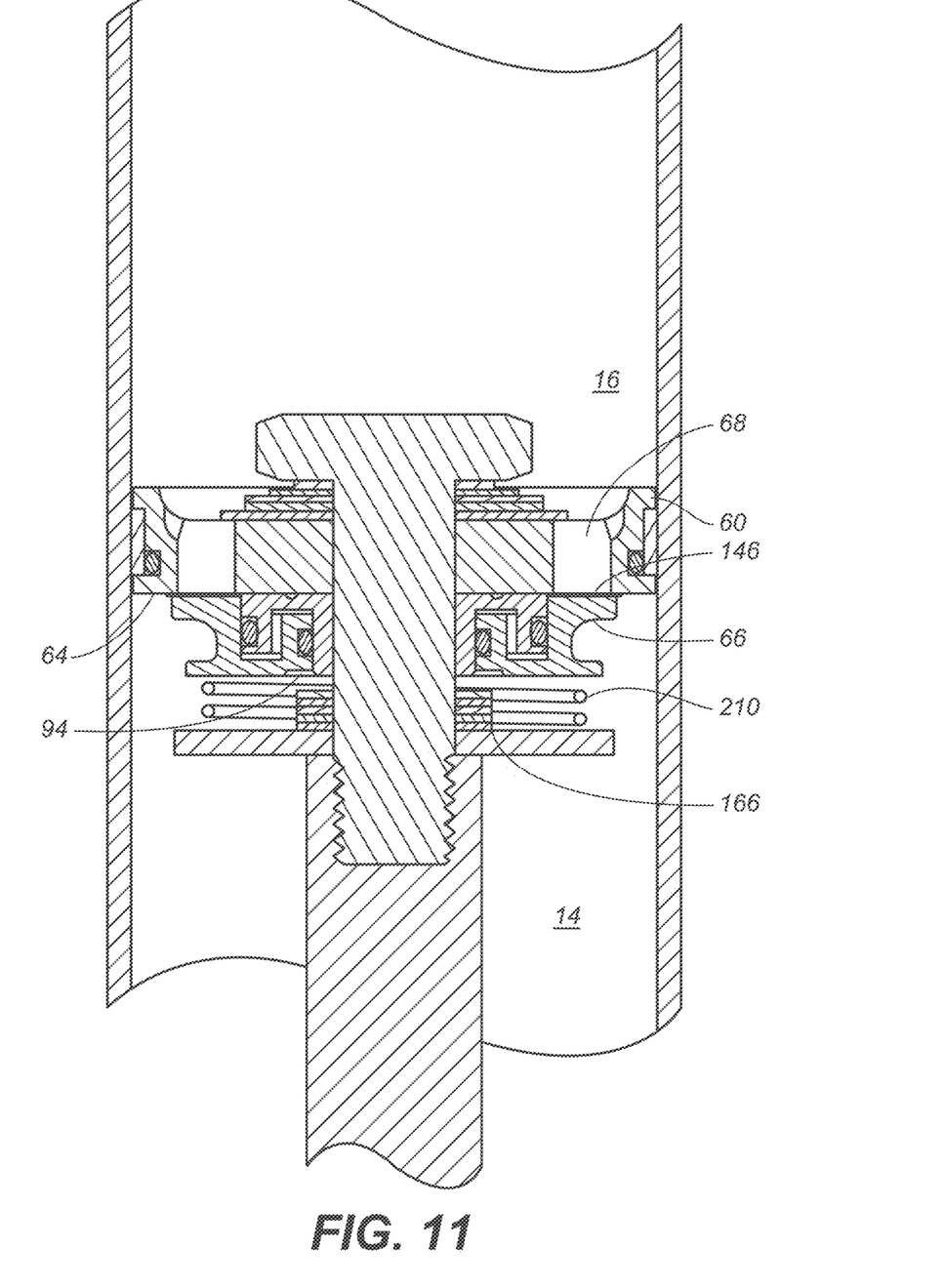
FIG. 11 depicts a sectional view of an alternative embodiment of the piston shown in FIGS. 2 and 3, wherein a coil spring is employed to add additional closing force of the passage through the piston, in accordance with an embodiment.

In FIG. 11, in accordance with an embodiment, a coil spring 210 is shown in contrast to a Belleville washer 200 as a means of additionally biasing the sliding valve 66, and thus the thin annular disk 146 against the opening of the arcuate passages 68 in the underside face 64 of the piston 60. To maintain the same distance between the uppermost surface of the one or more spacers 166 and the recessed face 94 of the sliding valve 66, additional spacers are added to extend the height or span thereof from the limit plate. The coil spring 210 is shown in FIG. 11 in an extended but still compressed position, wherein force is imparted by the coil spring 210 against the underside of the sliding valve 66, urging the sliding valve 66, and thus the thin annular disk 146, in a position to seal the opening of the arcuate passages 68 through the underside face 64 of the piston 60. To move the thin annular disk 146 away from the openings of the arcuate passages 68 in the underside surface 64 of the piston 60, the pressure in the arcuate passages 68, multiplied by the cross sectional area of those arcuate passages 68, must exceed the pressure in the rebound volume 16 multiplied by the effective area of the valve which is exposed to the rebound volume 14 plus the force of the coil spring 210 acting to urge the sliding valve 66 in the direction of the piston 60.

Although the valve assembly herein has been described in terms of incorporation thereof into a damping piston of a damper, the valve assembly using a thin annular disk as a closure member as described herein is applicable to a stationary hydraulic valve where a valve element moves away from the valved opening in a spaced relationship. Likewise, although a thin annular disk is described herein as effective to eliminate noise emanating from a hydraulic valve, the noise reducing or eliminating element may take on other forms. For example, instead of a right circular annular plate, the thin element may be contoured, in profile, to fit only over the openings, as long as some type of alignment mechanism is provided to allow the disk freedom of movement in the radial, axial and rotational directions, but also realign the element when closure of the openings therewith is required. Likewise, an inner ring having extensions or petals extending therefrom, which is free to move but realigned during valve closure, may be employed. Further, the shape of the closure member inner opening need not be circular, but may include flats thereon, or other internal features, so long as freedom of the closure element to move is not unduly restricted. Additionally, the dimensions such as thickness, shape, diameters, etc., the noise reducing or eliminating element can be readily determined by one skilled in the art by simple trial and error. The damper elements, but for the seals, may be made from metals such as steel, or from non-metallic materials wherein sufficient wear resistance of the material from fluid flowing through the openings and rubbing of parts, may be used for the damper and valve components.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What I claim is:
1. A valve body configured to be positioned for opening and closing of a fluid passage therethrough, said valve body comprising:
   a first element having at least one fluid passage extending therethrough and having an opening at a first surface thereof;

a second element moveable with respect to said opening at said first surface of said first element, said second element movable away from or toward said first element;

a third element having a thickness and positioned between said first element and said second element, said third element not physically rigidly connected to either said first element or said second element, said third element not constrained to move away from or toward said first element when said second element is positioned away from said first element by a distance greater than said thickness of said third element, said third element preventing fluid flow through said at least one fluid passage when said second element is positioned away from said first element by a distance equal to said thickness of said third element;

a guide element disposed adjacent to said second element, wherein said guide element and said second element comprise complementary surfaces which constrain said second element to move only away from or toward said first element, and wherein said guide element comprises:
  an outer diameter adjacent to, and spaced from, an adjacent surface of said second element, and said third element extends around said guide element and comprises an inner diameter greater than said outer diameter of said guide element; and a mechanical biasing element configured to urge said second element in a direction of said first element, wherein said valve body has a position wherein said third element is not contacted by said mechanical biasing element.

2. The valve body of claim 1, wherein, when said second element is biased toward said first element such that said second element is positioned away from said first element by said distance equal to said thickness of said third element, said third element is held between said first element and said second element, and said third element is constrained against movement away from or toward said first element.

3. The valve body of claim 1, wherein said thickness of said third element is between 15 and 40 percent of a maximum distance that said second element is separated from said first element.

4. The valve body of claim 1, wherein said first element comprises:
  a second surface through which a fluid passage extends, and a position of said second element with respect to said first element is a function of a difference in fluid pressure at a first fluid surface and a second fluid surface of said first element.

5. The valve body of claim 4, further comprising:
  an additional flow passage extending from said first surface to said second surface thereof, said additional flow passage being controlled by a second valve.

6. The valve body of claim 5, wherein said second valve comprises:
  a shim valve.

7. The valve body of claim 1, wherein said first, said second and said third elements are positioned on an end of a push rod and within a housing of a hydraulic damper.

8. The valve body of claim 1, wherein said mechanical biasing element is selected from the group consisting of: a Belleville washer and a coil spring.

* * * * *